Figure 1:
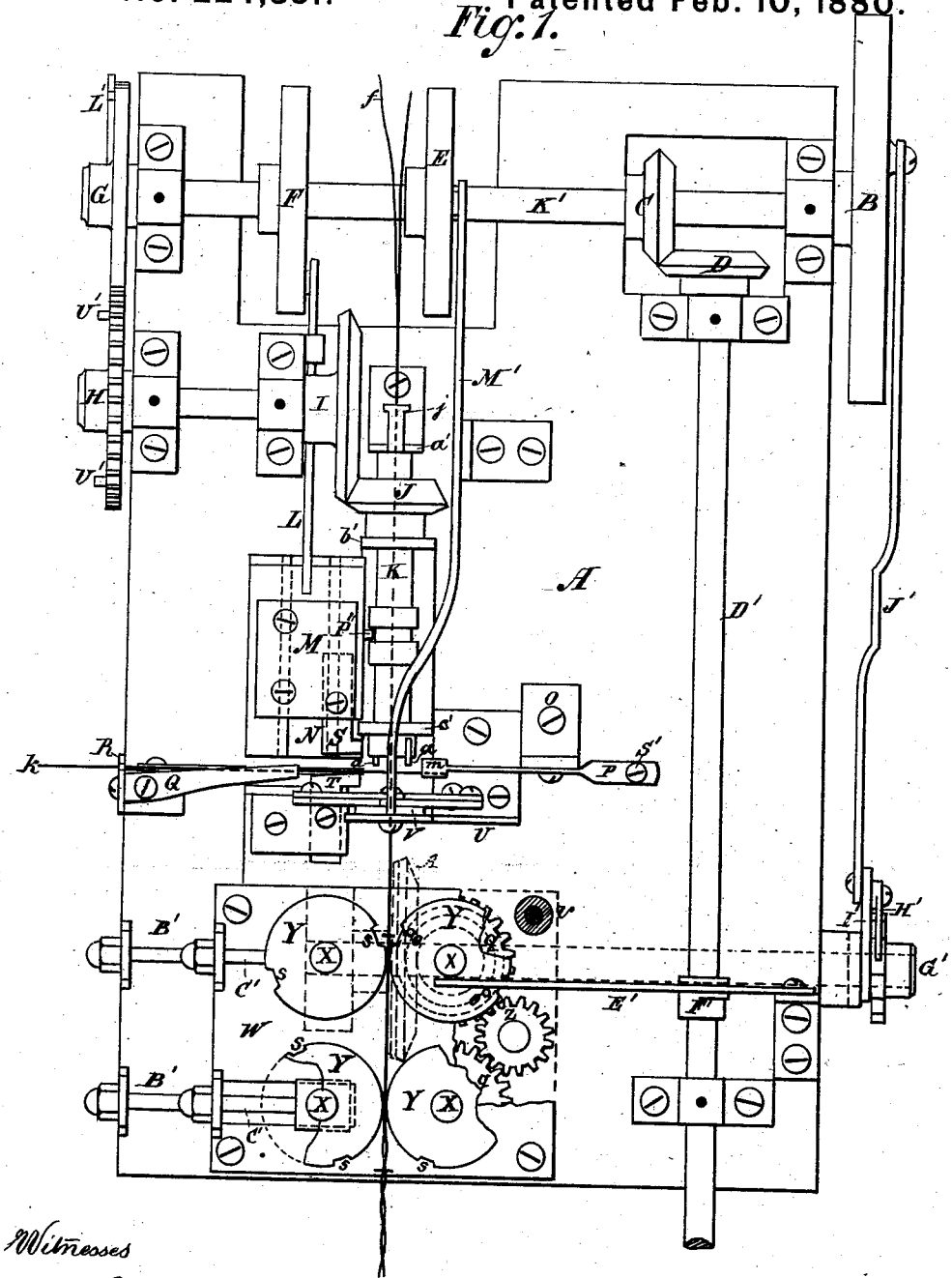

3 Sheets—Sheet 1.

H. W. PUTNAM.
Fence-Wire Barbing Machine.

No. 224,351. Patented Feb. 10, 1880.

Witnesses
Chas. H. Smith
Harold Serrell

Inventor
Henry W. Putnam.
per Lemuel W. Serrell atty

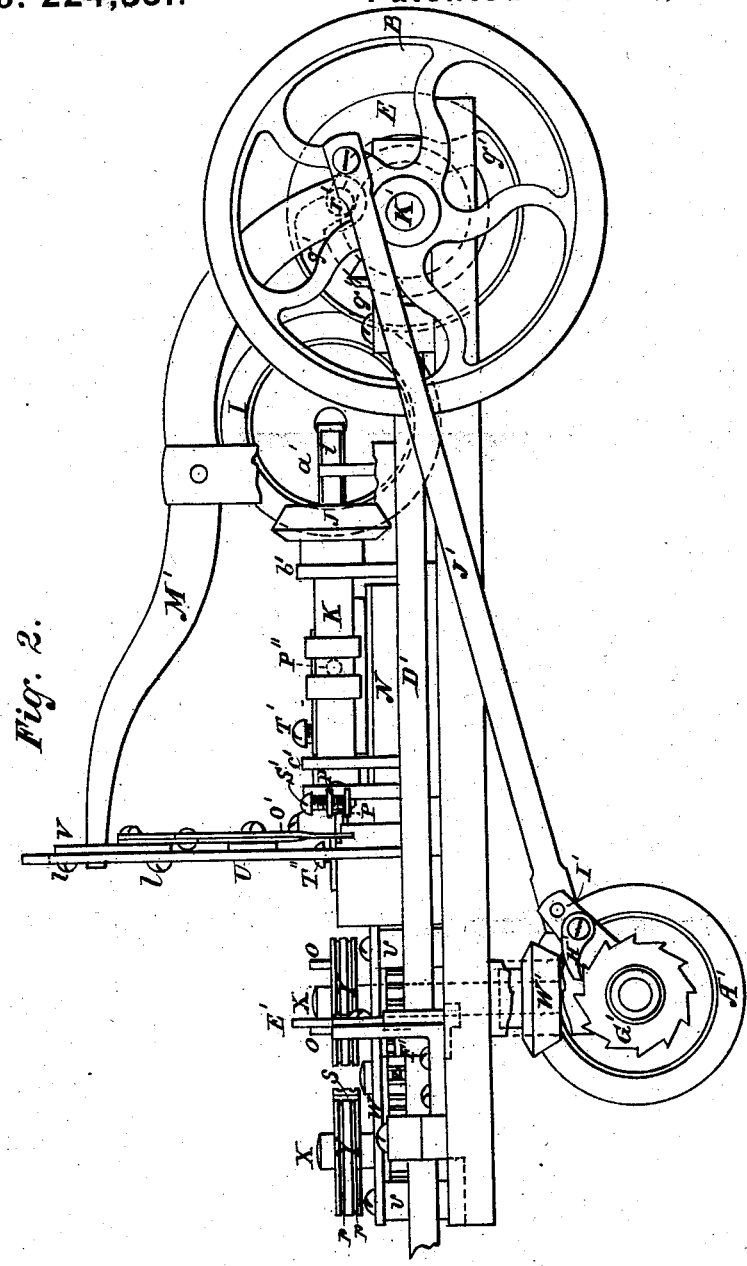

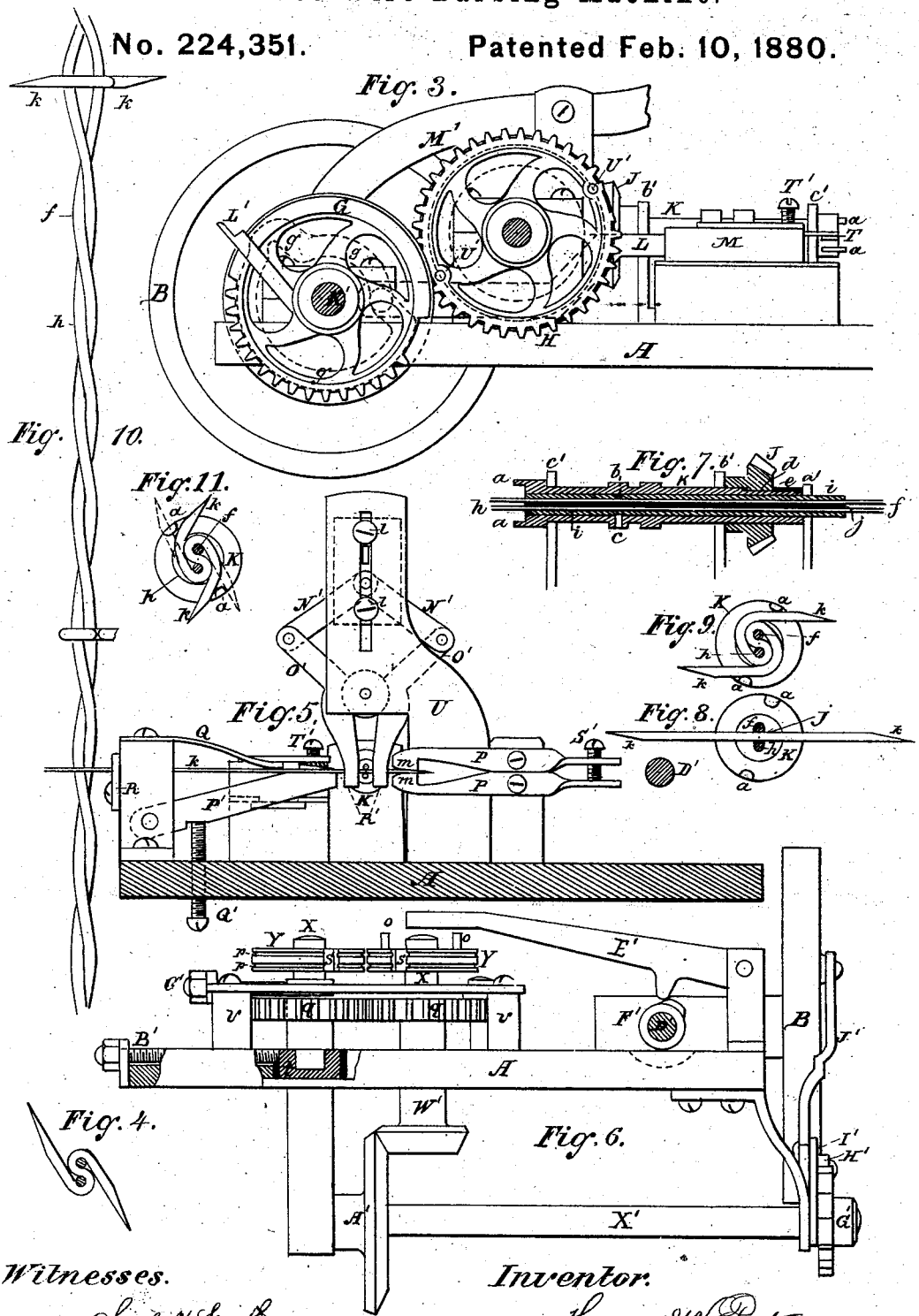

UNITED STATES PATENT OFFICE.

HENRY W. PUTNAM, OF BENNINGTON, VERMONT.

FENCE-WIRE-BARBING MACHINE.

SPECIFICATION forming part of Letters Patent No. 224,351, dated February 10, 1880.

Application filed November 17, 1879.

*To all whom it may concern:*

Be it known that I, HENRY W. PUTNAM, of Bennington, in the State of Vermont, have invented an Improvement in Fence-Wire-Barbing Machines, of which the following is a specification.

This machine is for making what is known as the "S-barb cable fence-wire." The two longitudinal wires pass side by side through a tubular guide, the hole in which is adapted to receive the two wires side by side and prevent them from twisting about each other, and the barb-wire is introduced between and at right angles to them. It is cut off to length, and a cylindrical barb-winder that revolves around the tubular guide bends the wire into the S-shaped barb, and there is a movement given to the barb-winder endwise of the wire while being rotated.

In the drawings, Figure 1 is a plan of the barbing mechanism. Fig. 2 is a side view, partially in section, of the barbing mechanism. Fig. 3 shows the stop-motion gearing. Fig. 4 shows the S-shaped barb; Fig. 5, the device for holding the fence-wires while the barb is being applied. Fig. 6 is an elevation of the drawing-rollers that move the wire along. Fig. 7 is a section of the tubular guide for the wire and the barb-winder; Fig. 8, an end view of the barb-winder, ready to act on the wire. Fig. 9 represents the winder with the barb completed. Fig. 10 represents the fence-wire with the barbs upon it; and Fig. 11 represents the winder with the barbs wound to a less extent than in Fig. 9.

The tubular guide $j$ has a hole through it that is adapted to pass the fence-wires $f$ through it side by side or parallel, such hole not being circular, but elliptical, so that the wires can pass through freely, but cannot be revolved in the hole. (See Figs. 6, 8, and 9.)

The tubular guide $j$ is held at one end in the stationary head $a'$, Figs. 1 and 7, so that it cannot revolve; but it may slide endwise. Around this tubular guide $j$ there is the tubular barb-winder K, having projecting fingers $a$ at one end. This tube K is supported in the stationary heads $b'$ $c'$ on the bed A. There is a groove and key at $b$ $c$, Fig. 7, that connects the tube K and guide $j$, so that they must move endwise together; but the tube K can be revolved around the guide $j$.

Motive power is applied to the wheel B and shaft K', and the same acts, by the gear-wheel G, upon the wheel H, to revolve the same periodically, there being a plain segmental portion and an arm, L', on G, and two concave segments and two studs, U', on the wheel H, the whole forming a stop-gear that revolves the wheel H half a turn for each revolution of the wheel G.

The wheel H is upon a shaft that carries a miter-gear, I, and revolves the wheel J, that surrounds the barb-winding tube K', and is connected thereto by a key or feather, so that the tube K can be moved endwise as the same is revolved, in order that the winding of the barb may be performed while the cylinder is moving endwise.

The barb-wire $k$ passes through a guide, R, beneath a spring, Q, that presses it upon a channel-piece, P', (see Fig. 5,) and there is a standing shear, T, and moving shear S, that cut off the barb with a diagonal and shearing cut, and the shear S is connected to the stock M, that slides in the bed-block N on A, and the cam F on K' gives motion, through the rod L, to this stock M, to shear off the barb-wire, and at the same time the pin or fork P'' on M gives end motion to the barb-winder K, before described.

The screw Q', beneath the channel-piece P', adjusts the latter so that the pointed end of the barb-wire is directed and it passes through between the fence-wires $f$. When the shear S has been drawn back it is to be understood that continuously-revolving friction-rollers or other devices are employed to project the barb-wire forward at the proper time.

The jaws $m$ form stops for the end of the barb-wire. (See Fig. 5.) These are on levers P and adjusted by the screw S'. The end of the barb-wire, as cut to form a point, is stopped by these jaws $m$ without the end of the barb being blunted by contact with the metal.

It will now be evident that if the barb-winding cylinder K is revolved, after the barb has been inserted through between the wires and cut-off, the fingers $a$ $a$ will carry the barb-wire around the wires $f$, bending the same into the S-shaped barb, during which time the tubular guide $j$ will hold the wires $f$ in position. I have, however, also employed holding-jaws R' at the ends of levers $o'$ to grasp the wires $f$ and keep them firm while the barb is being twisted around such wires $f$. The fulcrum for these levers $o'$ is upon the standard U, and the toggle-bars N' connect the levers $o'$ with a plate that slides upon the standard U and is moved by the lever M' and cam E. By these means the jaws R' are opened and closed at the proper time.

The wires $f$, being fed from suitable reels, pass through the tubular guide $j$, the barb-wire is run across at the end of $j$ between the wires $f$, the barb cut off, then the winder K and guide-tube $j$ are moved endwise to clear the ends of the barb, and the winder K is revolved, bending the barb into the S shape, and the end movement brings the fingers $a$ adjacent to the jaws R', so that the final finishing of the barb is between the end of K and said jaws R', and the barb is held firmly in position and kept in a plane at right angles to the wire.

The wire $f$ may be forced through the machine by frictional feeding devices acting upon the same before it enters the tubular guide $j$. I have, however, shown the feeding-rollers Y Y in pairs, operated upon by the gearing $q$ $z$, Fig. 1, that receives motion from bevel-gears W' A' and shaft X', Fig. 6, and to move these periodically the ratchet-wheel G', pawl H', and connecting-rod J' from the fly-wheel B are employed.

The movement of the feed-wheels Y should be arrested when the barbs are being applied to the wires $f$, and when the feed takes place the barbs pass into the recesses $s$ $s$ on the wheels Y, and are not injured. It is to be understood that this feed-movement takes place as the barb-winder K and tubular guide $j$ are being carried back, and after the jaws R' have been opened to relieve the wires $f$ and to allow the barb to pass through.

The stop-lever E' and pins $o$ upon one of the feed-rollers Y are used to arrest the movement of the rollers Y during the barbing operation. The cam F', Fig. 6, on the shaft D' acts against $n$ to raise this lever E' when the feed is to take place, and drop the lever E' in the path of one of the pins $o$, so that the movement of Y is stopped at the right moment. This cam F' and shaft D' are moved by the gears C D.

The rollers Y are to be grooved, so as to grasp the wires $f$, and the screws B' adjust the lower bearings, $t$, Fig. 6, of the shafts of Y, and the screws C' adjust the upper bearings of Y so as to suit different sizes of wires, and to apply the proper pressure to the same.

The wires $f$, with the barbs upon them, pass these rollers in a parallel, or nearly parallel, condition; but as they leave the said rollers the twist is applied to the wires $f$ to twist them into the condition shown in Fig. 10, and for this purpose the winding-reel is revolved around an axis in line with the wire, and also upon its own axis, so as to wind up the wire upon the reel.

I do not claim in this application the non-rotating tubular guide for two longitudinal fence-wires adapted to hold them, while at the same time allowing them to be drawn through such tubular guide, in combination with a barb-winder surrounding such tubular guide and receiving a rotary movement; nor the non-rotating tubular guide for the two longitudinal fence-wires, and the barb-winder surrounding such tubular guide, in combination with mechanism for revolving the barb-winder and mechanism for moving the barb-winder and guide endwise; neither do I herein claim the combination, in a fence-wire-barbing machine, of mechanism for introducing the barb-wire between two longitudinal wires, mechanism for twisting the barb-wire around the longitudinal wires, and mechanism for twisting the longitudinal wires together, the same being set forth in a prior application made by me.

I claim as my invention—

1. The combination, with the barb-winder, of the jaws $m$, that form stops for the pointed end of the barb-wire, substantially as set forth.

2. The combination, with the barb winding and cutting mechanism, of the two jaws R' and their actuating-levers for holding the wires $f$, and the jaws $m$, forming stops for the barb-wire, substantially as set forth.

3. The combination of the lever E', pins $o$, and cam F' with the feed-rollers Y, notched at $s$, and their actuating mechanism, and the barb supplying, cutting, and twisting devices, substantially as set forth.

Signed by me this 13th day of November, A. D. 1879.

HENRY W. PUTNAM.

Witnesses:
HAROLD SERRELL,
GEO. T. PINCKNEY.